June 1, 1965 J. GIJZENBERG 3,186,495
SEED BED HARROW
Filed April 27, 1964 3 Sheets-Sheet 3
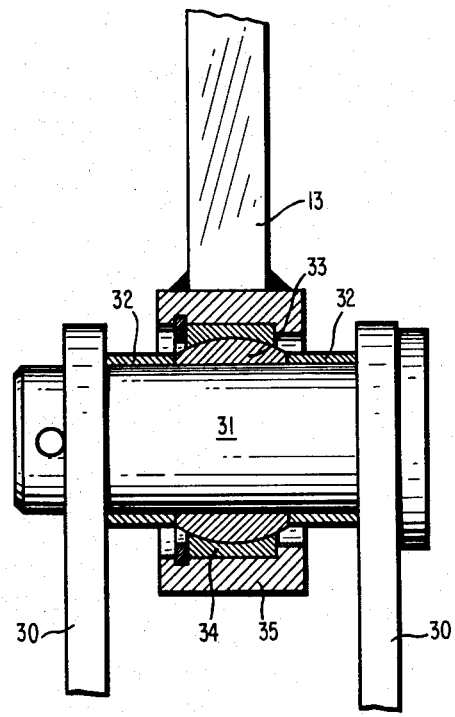
FIG:5.
INVENTOR.
JOOST GIJZENBERG
BY
ATTORNEYS United States Patent Office 3,186,495
Patented June 1, 1965

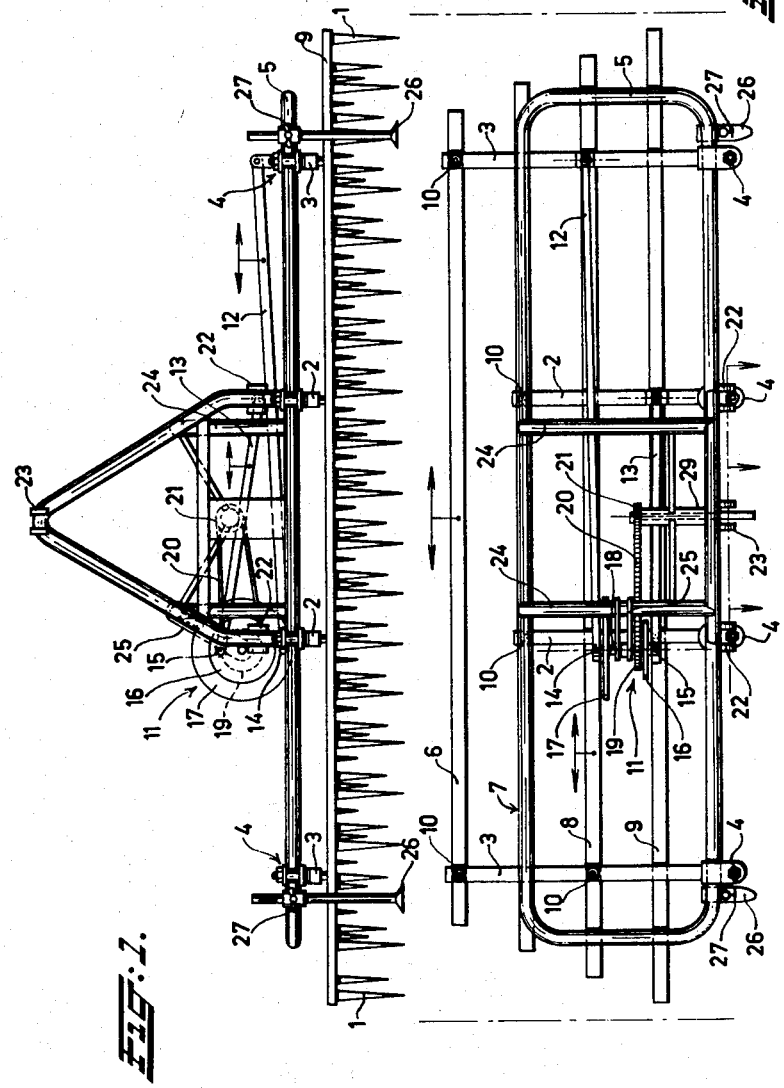

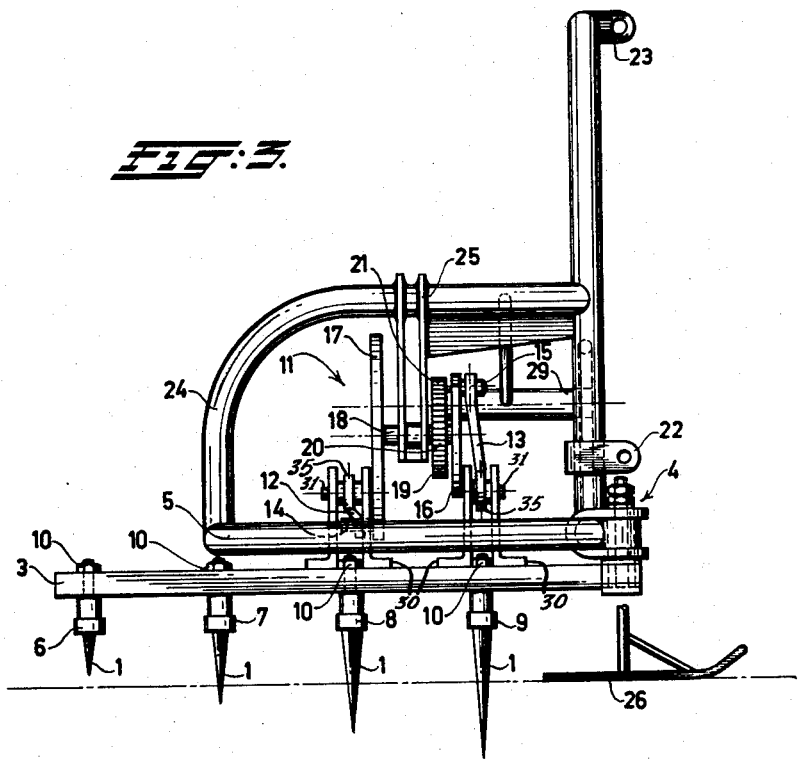
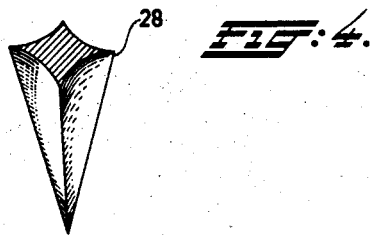

3,186,495
SEED BED HARROW
Joost Gijzenberg, 933 Aalsmeerderweg,
Nieuw Vennep, Netherlands
Filed Apr. 27, 1964, Ser. No. 362,912
4 Claims. (Cl. 172—102)

My invention relates to a device for harrowing farmland which device comprises a frame with a number of harrow beams, having tines, the said beams being disposed behind one another and capable of reciprocation in a direction transverse to the direction of travel, the amplitude of the to and fro movement of the harrow beams—as seen contrary to the direction of travel—increasing from a small value to a greater value. Such a device is known wherein the reciprocating beams are accommodated in a frame, the ends of the harrow beams being guided in tubes. This construction has a width which is larger than that of the soil strip which is harrowed, in other words the sides of the harrow protrude beyond the surface to be harrowed.

This is sometimes inconvenient, specially in the cultivation of vegetation, in which it is often required to harrow in glass houses which involves that the harrow should be capable of working the strip of soil which is situated close along the supporting poles in the green house. Also in the cultivation of bulbs it is desired that the harrow is capable of working the soil close along the hedges around the field. This cannot be done with the known device.

It is an object of my invention to provide a seed bed harrow in which no difficulties as mentioned above are experienced. It is a further object to obtain a rectangular harrowing pattern of which the width is greater than the length of the longest harrow beam, so that by means of such an improved seed bed harrow it is possible to harrow close to any obstacle.

It is a further object of my invention to provide a seed bed harrow with such an effect that one round of harrowing suffices in order to obtain a smooth seed bed. For that purpose mostly two separate principal operations are necessary viz. in the first place routing the tilth which is situated under the top layer of the soil, in order to further a good permeability of the soil. In the second place there should be obtained a smooth seed bed with the material of the upper surface which is most suitable to promote the germination of the seeds and the starting growth of the young plants. It is therefore important that the suitable quality of the soil in its upper layer is not impaired by harrowing owing to the fact that this layer disappears in the tilth layer.

My invention aims to realise the combined doubled harrowing treatment in a single operation.

The device according to the invention will be clarified hereinafter with reference to the accompanying drawing, in which an embodiment is depicted; various particulars will be revealed hereinafter in the course of the description.

FIGURE 1 represents a front view of the device according to the invention, the said device being provided with means for suspending it to a tractor.

FIGURE 2 is a top view of the device according to FIG. 1, the said suspension means, being, however, not represented.

FIGURE 3 is a side elevation to an enlarged scale.

FIGURE 4 is a perspective view of a tine with a knife/lozenge shaped cross section.

FIGURE 5 is a detail elevation partly in section illustrating a driving rod connection to a longitudinal arm.

The harrow according to the invention is provided with tines 1, shorter longitudinal arms 2 and longer longitudinal arms 3, which are pivotally connected to a bearing frame 5 in the pivots 4 (FIG. 2).

Four harrow beams 6, 7, 8 and 9 are pivotally connected, in the pivots 10, with the longitudinal arms 2 and 3. The tines 1 are secured to the said beams. The various beams are equidistantly spaced, the spacing being about 20 cm.

The longitudinal arms 2 and 3 are reciprocated by a driving mechanism 11, consisting of driving rods 12 and 13, which are rotatably secured to eccentrically disposed pins 14 and 15 on driving wheels 16 and 17. These wheels are mounted on a shaft 18 on which is fitted a chain wheel 19, which is driven by a chain 20. The chain 20 runs over a chain wheel 21 of a shaft 29, which can be coupled to a power take-off shaft of a tractor upon which the harrow is suspended.

Each driving rod 12, 13 is secured to arms 3 and 2, respectively, by a pivot allowing a degree of universal movement, i.e., in three planes at right angles to each other as illustrated in FIG. 5. The arm 2, or 3, has affixed thereto upstanding spaced journal brackets 30 supporting the journal pin 31 in aligned apertures therein. Surrounding the pin 31 are cylindrical spacer bearings 32 on each side of a cylindrical bearing 33 having a spherical outer surface. A complementary bearing 34 engages the spherical surface of bearing 33 and is secured in a collar 35 fastened to the end of driving rod 13, or 12. Rods 12 and 13 at their opposite ends are pivotally mounted on crankpins 14 and 15 by similar bearings, not shown, or by self aligning ball bearings which allow a slight deviation of about 5° in three directions. In this manner the driving rods are provided with universal connections at each end which to permit the driving rods to oscillate slightly forward and back, and up and down as the driving wheels turn and the arms 2, 3 reciprocate laterally.

The eccentrically disposed pins 14 and 15 on the driving wheels 16 and 17 are arranged so as to be diametrically opposed to one the other, so that on driving the movement of the shorter longitudinal arms 2 is the mirror image of the movement of the longer longitudinal arm 3. Due to this movement of the longitudinal arms the harrow obtains a good stability, while it has been experimentally demonstrated that the effect of the harrow according to the invention is enhanced with respect to the prior art. As appears from the drawing the shorter longitudinal arms 2 bear the first and third row 9 and 7 of tines and the longer longitudinal arms 3 bear the second and fourth row 8 and 6 of tines. The harrow can be connected with the tractor by way of a usual three point suspension in suspension centres 22 and 23.

The bearing frame 5 is also supported by supporting rods 24, one of the supporting rods 24 and a support 25 ensuring that the driving mechanism 11 is safely positioned.

The level of the bearing frame 5 and consequently of the harrow in respect of the surface of the soil is adjustable by means of drag feet 26 which are clamped to the frame at 27.

Due to the adjustability of the drag feet it is possible to increase or decrease the value of the cutting depth of the tines 1. The decrease or increase referred to above is depending upon the thickness of the layer of the soil which is to be routed by means of the foremost rows of tines. In order to preserve the raking effect of the hindmost rows of tines it is desired, that whichever value is applied in relation to the cutting depth of the foremost rows of tines, the cutting depth of the hindmost rows remains about at the same level. For that reason the three point suspension in the suspension centre 23 is arranged in such a way that this centre can be moved slightly forwards or backwards so as to allow for a slight tilting movement of the bearing frame 5, whereby the foremost rows of tines can be either slightly lowered or lifted. This is not represented in the drawing.

In the harrow—as contemplated in a direction opposed to the direction of travel—the cutting depth of the harrow tines per beam decreases from a greater value to a smaller value. By their greater length the tines of the foremost harrow beams 6 and 7 rout and even the tilth situated under the top layer, while the amplitude of these harrow beams, when the harrow advances, is rather small, whereby the said tines have—in a cross direction—a velocity of movement which is slightly higher than the speed of advance of the harrow. As a result the top layer is hardly displaced. The tines of the subsequent harrow beams 8 and 9 are shorter and have a greater amplitude and therefore a higher velocity. For that reason the latter tines have a crumbling effect on the top layer of the soil and the tines of the last harrow beam may be considered like short rake tines which have a merely smoothing effect.

According to an embodiment which has been tested in practice the tines are secured to the beams so as to be adjustable in a vertical direction, whereby the required cutting depth can be adapted to the operative conditions. In FIG. 4 a knife shaped rib of a tine is denoted by 28. Tines with a knife/lozenge shaped cross section are most suitable for crumbling the top layer of the soil and routing the layer thereunder. The foremost row of tines should preferably be shaped in this way. This is specially advisable when there is a hard layer of soil. The diagonals of the cross section should then extend parallel and transverse to the direction of movement.

No fastening means for a sowing machine to be trailed by the harrow are shown. These fastening means are of importance when immediately after harrowing the soil should be sown which is advantageous in regard of the limitation of the operations for working the soil.

It should be noted that it has appeared in practice that the pull required in order to keep the device going is rather small as compared with the required pull in conventional trailing harrows. It can therefore be said that the power used is applied in an efficient way.

The amplitude of the harrow beams 6–9 is such that the sum total of the length of each of the said beams and the double value of its amplitude is constant for the whole harrow. This signifies that the harrow can operate over a strip of soil of which the width is larger than the maximum width of the harrow. This width is indicated in dot dash lines in FIG. 2. It is therefore possible to have the narrow move close along obstacles.

The seed bed harrow can advantageously be put behind a spading machine so that in a single operation various treatments of the soil can be performed.

What I claim is:

1. A device for harrowing farmland, which device comprises a frame with a number of harrow beams having tines, the said beams being disposed behind one another and capable of reciprocation in a direction transverse to the direction of travel, the amplitude of the to and fro movement of the harrow beams—as seen contrary to the direction of travel—increasing from a smaller value to a greater value, the tines of each harrow beam extending as far as to its extreme ends and the sum total of the length of each beam and the double value of its amplitude being constant.

2. A device according to claim 1, characterized in that—as contemplated in a direction opposed to the direction of travel—the cutting depth of the harrow tines per beam decreases from a larger value to a smaller value.

3. A device according to claim 1, characterized in that, the frame is adjustable in respect of the surface of the soil, so that the stroke depth of the tines of the foremost harrow beams varies, while the tines of the hindmost harrow beam preserve their constant stroke depth.

4. A device for harrowing farmland, which device comprises a frame with a number of harrow beams having tines, the said beams being disposed behind one another and capable of reciprocation in a direction transverse to the direction of travel, the amplitude of the to and fro movement of the harrow beams—as seen contrary to the direction of travel—increasing from a smaller value to a greater value, the tines of each harrow beam extending as far as to its extreme ends and the sum total of the length of each beam and the double value of its amplitude being constant, whereby—as contemplated in a direction opposed to the direction of travel—the cutting depth of the harrow tines per beam decreases from a larger value to a smaller value, the tines of the foremost harrow beams having a knife/lozenge shaped cross section the diagonals of which extend in a direction parallel and transverse to the direction of movement.

References Cited by the Examiner

UNITED STATES PATENTS 2,706,439  4/55  Ellingboe _____ 172—101 X

FOREIGN PATENTS 1,014,379  6/52  France.

ANTONIO F. GUIDA, *Acting Primary Examiner.*

T. GRAHAM CRAVER, *Examiner.*